3,308,159
1-PHENYL-1-CYCLOALKYL-ω-AMINO-1-
ALKYLENE COMPOUNDS
Karl J. Doebel, Ossining, N.Y., assignor to Geigy Chemical Corporation, Greenburgh, N.Y., a corporation of Delaware
No Drawing. Filed Nov. 20, 1964, Ser. No. 431,236
7 Claims. (Cl. 260—570.5)

This application is a continuation-in-part of my application Serial No. 290,928, filed June 27, 1963, now abandoned.

This invention relates to certain novel compounds which possess valuable pharmacological properties and are useful as pharmaceutical agents.

More particularly, this invention pertains to certain 1 – phenyl – 1 – cycloalkyl–ω–amino–1-alkylene compounds which may be represented by the following general formula:

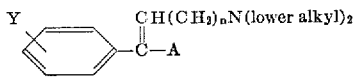

I wherein

A represents cycloalkyl, preferably cyclopentyl or cyclohexyl;

Y is halogen—preferably chlorine or bromine-trifluoromethyl, lower alkyl or lower alkoxy;

$n$ is an integer of 2 to 6

The term "lower alkyl" as used herein per se and as included in the term "lower alkoxy" means saturated monovalent straight-chain or branched-chain aliphatic radicals of the general formula —$C_mH_{2m+1}$ wherein $m$ designates an integer of less than five.

Briefly, the compounds of this invention may be synthesized by reacting a phenyl-cycloalkyl ketone II with a Grignard reagent of an ω–amino (lower) alkyl halide III and by dehydrating the resulting carbinol IV.

The mode of formation of these compounds may be illustrated by the following equation:

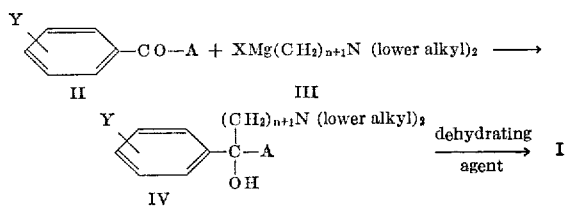

wherein A, Y and $n$ have the above-described meanings, and X signifies halogen.

More specifically, the subject compounds are prepared as follows:

(1) A phenyl-cycloalkyl (preferably cyclopentyl and cyclohexyl) ketone, which can be made in accordance with prior art methods exemplified below, is reacted with a Grignard reagent of an ω–amino (lower) alkyl halide which is commercially available. This halide is preferably the chloride or bromide but also the iodide can be used. The Grignard reagent of this halide is prepared in accordance with conventional procedures.

(2) The resulting carbinol, a 1-phenyl-1-cycloalkyl-1 hydroxy-ω-aminoalkane, is then dehydrated by e.g., refluxing it with a dehydrating agent, such as, phosphorous oxychloride, thionyl chloride, sulfonyl chloride, potassium bisulfate, or also by boiling with iodine in such solvents as benzene, toluene, xylene.

Alternatively, the above compounds can be produced by reacting the phenylcycloalkyl ketone II with an alkynyl halide V, preferably the chloride or bromide but also the iodide, under basic conditions exemplified by liquid ammonia, butyl lithium in hexane, etc. Subsequently, the intermediate obtained VI is either first hydrogenated and then reacted with a secondary amine or first reacted with an amine and then hydrogenated, all in accordance with standard techniques. The carbinol obtained IV in consequence of such hydrogenation and amination is then dehydrated as described above to afford the desired compounds.

This synthesis may be shown by the following illustrative reaction scheme:

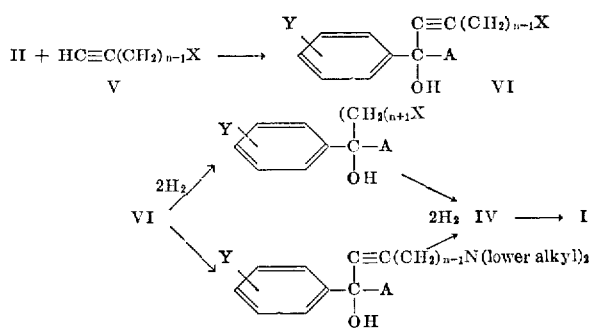

wherein the symbols used have the above-indicated significance.

The final dehydrated compounds which are obtained and which structure is characterized by Formula I, however, are admixed as determined by NMR spectra, with their respective isomers (phenylcycloalkyl-ω-aminoalkylmethylene) having the following structural formula I+ (the symbols being as defined above):

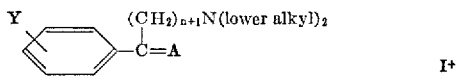

I+

Compounds of Formula I wherein e.g., A is cyclopentyl are admixed with their respective isomers of Formula I+ to the extent of up to 40%, while compounds of Formula I wherein e.g. A is cyclohexyl are admixed with their respective isomers of Formula I+ to the extent of up to 10%.

These isomers, as well as mixtures of the subject compounds with these isomers, are within the scope of the inventive concept and it is to be understood that the term "1-phenyl-1-cycloalkyl-ω-amino-1-alkylene" compounds whenever and however used herein in the specification and the claims includes by definition mixtures thereof with their respective isomers as well as said isomers per se.

Compounds of Formula I, as is evident to those skilled in the art, can exist in cis- and trans-isometric form; consequently, it is to be understood that both isomeric forms are within the purview of this application.

The present invention comprehends not only the above-described compounds in their free base form, but it also includes pharmaceutically acceptable nontoxic acid addition salts which may be formed from said compounds in accordance with conventional practice, by using appropriate inorganic and organic acids, such as, hydrohalic acids, especially hydrochloric and hydrobromic acids, sulfuric, ethanesulfonic and phosphoric acids as well as acetic, aminoacetic, lactic, succinic, malic, aconitic, phthalic and tartaric acids.

As mentioned above, the subject compounds possess valuable pharmacological properties. These compounds have a pronounced activity on the central nervous system: they exhibit notable appetite suppressant activity, but also antispasmodic and stimulant activity. These compounds can thus be used as appetite suppressant, antispasmodic and stimulant agents, preferably in association with a suitable pharmaceutical carrier for e.g., peroral administration.

By way of illustration, the compound of Example 1 [1-(m-chlorophenyl)-1 - cyclopentyl - 4 - dimethylamino- 1-butene hydrochloride], which has an $LD_{50}$ of 600 mg./ kg. p.o. in mice, gave the following results when tested for anorexic activity; at a dose of 100 mg./kg. p.o. it reduced food consumption by 50% and caused a weight loss of 32%. These results represent averages over a five day period during which the above compound had been administered once a day to a group of eight mice.

These new compounds and the methods for their preparation may be exemplified more fully by the following illustrative examples; the scope of the invention is, however, not limited thereto. The temperatures therein are given in degrees centigrade.

EXAMPLE 1

*1-(m-chlorophenyl)-1-cyclopentyl-4-dimethylamino-1-butene*

(a) *m-Chlorophenyl-cyclopentyl ketone.*—Cyclopentyl magnesium bromide was prepared by reacting 38 g. of cyclopentylbromide with 6 g. of magnesium in 150 ml. of dry ether. A solution of 18 g. of m-chlorobenzonitrile in 100 ml. of dry ether was added dropwise at 10°. Benzene was added and the ether removed by distillation. The benzene solution was refluxed for 2 hours. About 100 g. of cracked ice was added, followed by 200 ml. of 6 N hydrochloric acid. The reaction mixture was then refluxed for a further 2 hours to hydrolyze the ketimine hydrochloride. After cooling, the benzene layer was separated and the aqueous layer extracted once with ether. The two extracts were combined, dried and the solvents removed in vacuo to give 23.5 g. of an oil. This was reacted in ethanolic solution with 18.9 g. of Girard's "T" reagent. Separation according to standard procedure gave 8.774 g. of m-chlorophenylcyclopentyl ketone which was distilled; B.P. 90–92°/0.3 mm.; $n_D^{25}$ 1.5541.

(b) *1-(m-chlorophenyl)-1-cyclopentyl-1-hydroxy-4-dimethylaminobutane.*—Ten g. of magnesium were mixed with 1 g. of iodine and the flask was swirled under vacuum while flaming until most of the iodine had sublimed. The so-activated magnesium was cooled under vacuum and 3.4 g. of it was weighed out and placed in a 500 ml. 3-necked round bottomed flask and covered with 15 ml. of dry ether. 40–60 drops of ethylbromide was introduced as an entrainer and the reaction started off. A solution of 16.65 g. of 3-dimethylaminopropyl chloride in 30 ml. of dry ether was then slowly dropped in. A white precipitate formed immediately. After the addition was complete, the reaction mixture was kept at reflux for 3 hours and thereafter the solution of 10 g. of m-chlorophenylcyclopentyl ketone in 50 ml. of dry ether was run in. The reaction was allowed to proceed overnight at 40°. The material was then poured into ice water containing substantial quantities of ammonium chloride and separated by a series of extractions with ether and acid base into neutral and basic fractions. Working up gave:

(A) 5.0 g. of neutral material
(B) 7.2 g. of basic material (c) *Desired compound.*—The basic material (B) was mixed with 20 ml. of phosphorus oxychloride and the mixture was refluxed for one hour. After cooling, it was poured into ice and agitated until all of the phosphorus oxychloride had decomposed. The solution was rendered strongly alkaline with concentrated sodium hydroxide and extracted with ether. The combined ethereal extracts were washed with water, dried over anhydrous sodium sulfate and the solvent removed. The residue weighed 5.4 g. and it was distilled in high vacuum to yield 5.2 g. of a colorless oil; B.P. 124–126°/0.5 mm.; $n_D^{24}$ 1.5352. After conversion to the hydrochloride (no shift in the UV spectrum) the latter was recrystallized from methylethyl ketone and finally from ethanol ether; M.P. 190–191°.

Analysis for $C_{17}H_{24}ClN \cdot HCl$ (in percent): Calcd. C, 64.9; H, 8.02; N, 4.46; Cl, 22.55. Found C, 64.8; H, 7.98; N, 4.21; Cl, 22.72.

EXAMPLE 2

*1-(p-methoxyphenyl)-1-cyclopentyl-4-dimethylamino 1-butene*

(a) *p-Methoxyphenylcyclopentyl ketone.*—This ketone was prepared according to the procedure of Curtin and Schmukler [J.A.C.S. 77, 1105 (1955)]. They reported a B.P. of 139.5–141.5°/1.4 mm. and $n_D^{25}$=1.5562. My constants are: B.P. 108°/0.08 mm. Hg and $n_D^{25}$=1.5570.

Analysis for $C_{13}H_{16}O_2$ (M=204.26): Calcd. C, 76.44; H, 7.90. Found C, 76.74; H, 7.74.

(b) *1-(p-methoxyphenyl)-1-cyclopentyl-1-hydroxy-4-dimethylaminobutane.*—To a solution of ω-dimethylaminopropylmagnesium chloride prepared from 10.4 g. of magnesium turnings and 51.0 g. of ω-dimethylaminopropyl chloride in a total of 110 ml. of anhydrous ether was added dropwise a solution of 30.0 g. of p-methoxyphenylcyclopentyl ketone in 230 ml. of benzene. The ether was removed by distillation and the residual benzene solution heated under reflux for two hours and then stirred at room temperature overnight. The combined organic extracts were worked up by extracting the organic phase with base, washing the latter with ether, reacidifying the basic aqueous solution with mineral acids and washing the acid aqueous phase with organic, water-immiscible solvents. The acid aqueous phase was then alkalized with 6 N or 10 N sodium hydroxide with cooling and the reaction product extracted with ether. The latter was extracted with water, dried over sodium sulfate, filtered and the solvent removed in vacuo. The residue was a yellow syrup weighing 35.8 g. It crystallized from petroleum ether and was recrystallized twice from the same solvent. M.P. 61–63°.

Analysis for $C_{18}H_{39}NO_2$ (M=291.42): Calcd. C, 74.18; H, 10.03; N, 4.81. Found C, 74.36; H, 9.97; N, 4.80.

I.R. (CHCl₃): γ OH: 3550 cm.⁻¹;
U.V. (MeOH): Shoulder at 205 mμ; max.: 225 mμ (ε=10,600).

(c) *Desired compound.*—A solution of 20.1 g. of the tertiary carbinol in 130 ml. of phosphorus oxychloride was refluxed for 64 hours. The mixture was cooled and poured onto ice with vigorous stirring. The mixture was rendered strongly alkaline with 10N sodium hydroxide solution while cooling and then extracted with ether. The combined extracts were washed with water, dried over sodium sulfate and the solvent removed in vacuo. The residue (18.6 g.) was distilled under high vacuum to give 12.2 g. of a clear liquid, B.P. 126°/0.1 mm., $n_D^{25}$=1.5310.

U.V. (MeOH): Shoulder at 208 mμ (ε=15,300); λ_max. 228 mμ (ε=9,950); shoulder 245 mμ (ε=6,830).

Analysis for $C_{18}H_{27}NO$ (M=273.41): Calcd. C, 79.07; H, 9.96; N, 5.12. Found C, 78.62; H, 9.86; N, 5.17.

EXAMPLE 3

*1-(m-trifluoromethylphenyl)-1-cyclohexyl-4-dimethylamino-1-butene*

(a) *m-trifluoromethylphenylcyclohexyl ketone.*—Cyclohexylmagnesiumbromide was prepared from 57.5 g. cyclohexylbromide in 90 ml. ether and 8.55 g. magnesium turnings covered with 60 ml. dry ether. To this solution was then added 250 ml. of a solution of 50.0 g. m-trifluoromethylbenzonitrile in 200 ml. dry benzene. After the addition was complete additional 100 ml. benzene were added, the ether removed by distillation and the resultant mixture refluxed for two hours. 300 ml. of 6N aqueous hydrochloric acid was cautiously added and the mixture stirred for 3 hours. The mixture was then transferred to a separatory funnel and the organic phase washed with water, saturated sodium bicarbonate solution and water. After drying over sodium sulfate and removal of the solvent 65.0 g. of a liquid residue was obtained which was distilled under high vacuum to give 20 g. of unreacted nitrile (B.P. 35°/5.50 mm.) and 23.2 g. of desired ketone, B.P. 76–85°/0.05 mm. The latter fraction was redistilled to give 13.3 g. of pure ketone, B.P. 74–75°/0.04 mm., $n_D^{25}=1.4864$.

I.R. (film): $\gamma C=O$: 1680 cm.$^{-1}$;
U.V. (EtOH): $\lambda_{max}$.: 208 m$\mu$; $\lambda_{max}$. 236 m$\mu$ ($\epsilon=9,850$).

Analysis for $C_{14}H_{15}F_3O$ (M=256.26); Calcd. C, 65.71; H, 5.90; F, 22.24. Found C, 66.03; H, 5.85, F, 22.48.

(b) *1 - (m - trifluoromethylphenyl)-1-cyclohexyl-1-hydroxy-4-dimethylaminobutane*.—To a solution of $\omega$-dimethylaminopropylmagnesium chloride prepared from 17.9 g. of $\omega$-dimethylaminopropylchloride and 4.0 g. of activated magnesium in 150 ml. dry ether was added dropwise a solution of 13.3 g. m-trifluoromethylphenylcyclohexyl ketone in 40 ml. dry benzene. After addition of the ketone another 40 ml. of dry benzene was added and the ether removed by distillation. The resulting mixture was refluxed overnight and then cooled. The Grignard complex was decomposed by cautious addition of ammonium chloride solution. The organic solution was decanted from the precipitated salts and the latter washed twice with ether. The combined organic extracts were worked up by extracting the organic phase with base, washing the latter with ether, reacidifying the basic aqueous solution with mineral acids and washing the acid aqueous phase with organic, water-immiscible solvents. The acid aqueous phase was then alkalized with 6 N or 10 N sodium hydroxide with cooling and the reaction product extracted with ether. The latter was extracted with water, dried over sodium sulphate, filtered and the solvent removed in vacuo. The residual oil (11.2 g.) was immediately subjected to dehydration. The I.R. spectrum shows no carbonyl absorption.

(c) *Desired compound*.—11.2 g. of crude tertiary carbinol was dissolved in 65 ml. of phosphorus oxychloride and heated under reflux for 48 hours. The solution was then poured onto ice and rendered strongly alkaline with excess 10 N sodium hydroxide solution whilst keeping the latter below 20° by cooling. The alkaline solution was then extracted with ether and the combined ether extracts washed with water, dried over sodium sulfate and the solvent removed in vacuo. The liquid residue (9.9 g.) was distilled under high vacuum to give 6.9 g., B.P. 109°/0.09 mm. Hg, $n_D^{25}=1.4884$. The I.R. spectrum shows no OH absorption but a peak at 1590 cm.$^{-1}$ (C=C).

U.V. (EtOH) $\lambda_{max}$.: 210 m$\mu$ ($\epsilon=11,450$); shoulder $\lambda$234 m$\mu$ ($\epsilon=4,520$).

EXAMPLE 4

*1-(m-tolyl)-1-cyclohexyl-4-dimethylamino-1-butene*

(a) *m-tolylcyclohexyl ketone*.—To a solution of cyclohexylmagnesiumbromide prepared from 12.2 g. of magnesium and 81.5 g. of cyclohexylbromide in a total of 240 ml. of dry ether was added a solution of 50.0 g. m-tolunitrile in 250 ml. anhydrous benzene. The ether was removed by distillation and the resulting benzene mixture refluxed for four hours and then allowed to stand at room temperature overnight. To the cooled mixture was then added dropwise 350 ml. of 6 N hydrochloric acid, stirred vigorously for 5½ hours and transferred to a separatory funnel with 500 ml. ether. The combined organic phases were washed with water, sodium bicarbonate solution and water and dried over sodium sulfate. Removal of the solvents yielded the crude ketone mixture which was purified by repeated distillation under high vacuum to give 43.9 g. of m-tolycyclohexylketone, B.P. 100°/0.15 mm., $n_D^{25}=1.5353$.

I.R. (film): $\gamma C=O$: 1680 cm.$^{-1}$;
U.V. (EtOH): $\lambda_{max}$.: 216 m$\mu$ ($\epsilon=6,350$); $\lambda_{max}$. 247 m$\mu$ ($\epsilon=9,610$).

Analysis for $C_{14}H_{18}O$ (M=202.28): Calcd. C, 83.12; H, 8.97. Found C, 82.84; H, 8.67.

(b) *1 - (m - tolyl)-1-cyclohexyl-1-hydroxy-4-dimethylaminobutane*.—To a solution of $\omega$-dimethylaminopropylmagnesiumchloride prepared from 50.1 g. of $\omega$-dimethylaminopropylchloride, 13.2 g. of magnesium in 120 ml. dry ether was added a solution of 30.0 g. of m-tolylcyclohexylketone in 120 ml. anhydrous benzene. The ether was removed by distillation and the resulting mixture refluxed overnight. The reaction mixture was then worked up by extracting the organic phase with base, washing the latter with ether, reacidifying the basic aqueous solution with mineral acids and washing the acid aqueous phase with organic, water-immiscible solvents. The acid aqueous phase was then alkalized with 6 N or 10 N sodium hydroxide with cooling and the reaction product extracted with ether. The latter was extracted with water, dried over sodium sulfate, filtered and the solvent removed in vacuo. The liquid residue (10.7 g.) was immediately subjected to dehydration.

(c) *Desired compound*.—10.7 g. of crude tertiary carbinol in 65 ml. of phosphorus oxychloride was refluxed for 48 hours and worked up as described in the previous examples. The resulting oil (6.9 g.) was fractionated three times under high vacuum to yield 4.0 g. of a colorless liquid, B.P. 98–98.5°/0.01 mm., $n_D^{25}=1.5243$.

U.V. (MeOH): $\lambda_{max}$. 209 m$\mu$ ($\epsilon=16,500$); shoulder at 233 m$\mu$ ($\epsilon=5,200$).

Analysis for $C_{19}H_{29}N$ (M=271.43): Calcd. C, 84.07; H, 10.77; N, 5.16. Found C, 84.28; H, 10.89; N, 5.37.

EXAMPLE 5

*1-(1-p-bromophenyl)-1-cyclohexyl-4-dimethylamino-1-butene*

(a) *p - Bromophenylcyclohexyl ketone*.—Cyclohexylmagnesiumbromide was prepared from 7.9 g. of magnesium turnings and 49.0 g. of cyclohexylbromide in a total of 140 ml. of dry ether. To this solution was then added 50.0 g. of p-bromobenzonitrile in 300 ml. of dry benzene. The ether was removed by distillation and the resulting benzene solution was refluxed for 4 hours. After cooling the mixture was hydrolyzed with 200 ml. of 6 N hydrochloric acid and stirred for 3½ hours at room temperature. The mixture was then extracted with ether and the combined organic phases washed with water, sodium bicarbonate solution and water and then dried over sodium sulfate. After filtration and removal of the solvents the residue crystallized spontaneously. It was distilled to yield 50.0 g. of p-bromophenylcyclohexyl ketone, B.P. 120–125°/0.2 mm. Hg; M.P. 77–79°. The ketone can also be recrystallized from methanol. (M.P. 78–79°.)

I.R. (CHCl$_3$): $\gamma C=O$: 1670 cm.$^{-1}$;
U.V. (EtOH): $\lambda_{max}$. 209 m$\mu$ ($\epsilon=4,040$); $\lambda_{max}$. 254 m$\mu$ ($\epsilon=5,820$).

Analysis for $C_{13}H_{15}BrO$ (M=267.17): Calcd. C, 58.42; H, 5.66; Br, 29.90. Found. C, 58.65; H, 5.64; Br, 29.83.

(b) *1-(p - bromophenyl) - 1 - cyclohexyl-1-hydroxy-4-dimethylamino - butane*.—A Grignard reagent was prepared from 6.6 g. of magnesium and 32.0 g. of $\omega$-dimethylaminopropylchloride in 80 ml. of dry ether. To this solution were added 25 g. of p-bromophenylcyclohexyl ketone in 100 ml. of benzene. The mixture was refluxed overnight and worked up as described in Example 2. The residue was a liquid which solidified spontaneously (24.5 g.); it was recrystallized from acetone/hexane and had a M.P. 93–97°.

This material was immediately subjected to dehydration.

(c) *Desired compound.*—18.5 g. of 1 - (p - bromophenyl)-1-cyclohexyl-1-hydroxy-4 - dimethylaminobutane was dissolved in 120 ml. of phosphorus oxychloride and refluxed 63 hours. The resulting mixture was cooled and poured onto ice and worked up exactly as previously described in the other examples. 16.4 g. of a pale yellow oil was obtained which was twice fractionated in high vacuum to yield 4.98 g. of pure material, B.P. 112–118°/ 0.15 mm. Hg, $n_D^{25} = 1.5470$.

I.R. (film) shows no OH absorption $\gamma C=C$: 1650 cm.$^{-1}$.

EXAMPLE 6

*1-(p-chlorophenyl)-1-cyclohexyl-4-dimethylamino-1-butene*

(a) *1-(p - chlorophenyl - 1 - cyclohexyl ketone.*—To a stirred solution of cyclohexylmagnesiumbromide prepared from 66.6 g. of cyclohexylbromide and 9.95 g. of magnesium in 100 ml. of dry ether was added a solution of 37.5 g. of p-chlorobenzonitrile in 150 ml. of dry ether, followed by 400 ml. of anhydrous benzene. The ether was removed by distillation and the resulting solution refluxed for 2 hours, cooled and hydrolyzed with 300 ml. of 6 N hydrochloric acid. The reaction mixture was separated in organic and aqueous phase and the organic phase washed with saturated sodium bicarbonate solution and water, dried over sodium sulfate and the solvents removed in vacuo. The residual oil crystallized spontaneously and was distilled twice under high vacuum. 37.1 g. ketone, B.P. 106–108°/0.15 mm. Hg were obtained (M.P. 59–61°) and recrystallized from methanol to yield pure ketone, M.P. 61.5–62.5°.

Analysis for $C_{13}H_{15}ClO$ (M=222.71): Calcd. C, 70.10; H, 6.79; Cl, 15.92. Found C, 70.37; H, 6.75; Cl, 15.90.

(b) *1-(p - chlorophenyl) - 1 - cyclohexyl-1-hydroxy-4-dimethyl aminobutane.*—To a solution of ω - dimethylaminopropylmagnesiumchloride prepared from 50.0 g. of ω-dimethylaminopropylchloride and 7.2 g. magnesium in 90 ml. of dry ether was added 210 ml. of a solution of 30.0 g. of p-chlorophenylcyclohexyl ketone in dry benzene. The ether was removed by distillation and the resulting mixture refluxed for 12 hours. After cooling the mixture was worked up as described in Example 2. The residual oil (39.4 g.) crystallized spontaneously and was recrystallized from petroleum ether to yield the pure carbinol, M.P. 87–88°.

I.R. (CHCl$_3$): $\gamma$OH: 3520 cm.$^{-1}$.

Analysis for $C_{18}H_{28}ClNO$ (M=309.87): Calcd. C, 69.77; H, 9.11; Cl, 11.44; N, 4.52. Found C, 69.59; H, 9.10; Cl, 11.42; N, 4.53.

(c) *Desired compound.*—20.0 g. of 1 - (p - chlorophenyl)-1-cyclohexyl-1-hydroxy-4 - dimethylaminobutane was dissolved in 125 ml. of phosphorus oxychloride. Two drops of water were added (the addition of water was essential for the successful dehydration in this example) and the mixture was refluxed for 64 hours. After cooling, the mixture was poured onto ice, then rendered strongly alkaline and worked up as described in previous examples. 16.1 g. of a brown oil were obtained and purified by repeated fractional distillation under high vacuum. 12.2 g. of pure product was obtained as colorless oil, B.P. 124°/0.1 mm. Hg, $n_D^{25} = 1.5346$.

I.R. (film): no OH absorption. $\gamma C=C$ 1640 cm.$^{-1}$.

U.V. (MeOH): $\lambda_{max.}$ 209 m$\mu$ ($\epsilon$=10,700); $\lambda_{max.}$ 220 m$\mu$ ($\epsilon$=9,550); shoulder at 237 m$\mu$ ($\epsilon$=6,200).

Analysis for $C_{18}H_{26}ClN$ (M=291.86): Calcd. C, 74.07; H, 9.98; Cl, 12.15; N, 4.80. Found C, 74.18; H, 8.80; Cl, 12.18; N, 5.00.

It is readily obvious to a man skilled in the art that if in the above-described procedure, e.g. 4-diethylaminobutyl chloride or 5-dipropylaminopentyl chloride and e.g., p-trifluoromethylphenylcyclopentyl ketone are used, 1-(p-trifluoromethylphenyl) - 1-cyclopentyl-5-diethylamino-1-pentene or 1-(trifluoromethylphenyl)-1-cyclopentyl-6-dipropylaminohexene-1 are, respectively, obtained.

What is claimed is:

1. Compounds of the class consisting of a base of the formula

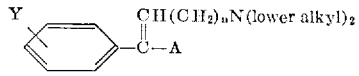

wherein;

A is cycloalkyl selected from the group consisting of cyclopentyl and cyclohexyl;

Y is selected from the group consisting of chlorine, bromine, trifluoromethyl, lower alkyl and lower alkoxy;

n is an integer of 2 to 5 and the non-toxic, pharmaceutically acceptable acid addition salts thereof.

2. 1-(m-chlorophenyl) - 1 - cyclopentyl-4-dimethylamino-1-butene.

3. 1-(p-methoxyphenyl) - 1 - cyclopentyl-4-dimethylamino-1-butene.

4. 1-(m-trifluoromethylphenyl) - 1 - cyclohexyl-4-dimethylamino-1-butene.

5. 1-(m-tolyl) - 1 - cyclohexyl - 4 - dimethylamino-1-butene.

6. 1-(1-p-bromophenyl) - 1 - cyclohexyl-4-dimethylamino-1-butene.

7. 1-(p - chlorophenyl) - 1 - cyclohexyl - 4 - dimethylamino-1-butene.

References Cited by the Examiner
UNITED STATES PATENTS

| | | | |
|---|---|---|---|
| 2,649,444 | 8/1953 | Barrett | 260—570 |
| 2,662,886 | 12/1953 | Ruddy et al. | 260—570.8 X |

FOREIGN PATENTS

| | | |
|---|---|---|
| 624,117 | 5/1949 | Great Britain. |
| 811,659 | 4/1959 | Great Britain. |

OTHER REFERENCES

Bonovicino et al., "Journ. Organic Chemistry," volume 26, pages 2388 and 2391 (1961).

Kjaer et al., "Acta Chemica Scand," volume 5, pages 1145–50 (1951).

Yale, "Journal of Med. and Pharm. Chem.," volume 1, No. 2, pages 121–33 (1959).

CHARLES B. PARKER, *Primary Examiner.*

JOSEPH P. BRUST, *Examiner.*

R. V. HINES, *Assistant Examiner.*